United States Patent
Kadoda

(10) Patent No.: US 10,223,373 B2
(45) Date of Patent: Mar. 5, 2019

(54) COMMUNICATION TERMINAL, COMMUNICATION SYSTEM, CONTROL TERMINAL, NON-TRANSITORY COMPUTER READABLE MEDIUM, AND COMMUNICATION METHOD

(71) Applicant: FUJI XEROX CO., LTD., Minato-ku, Tokyo (JP)

(72) Inventor: Akira Kadoda, Yokohama (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 308 days.

(21) Appl. No.: 14/522,040

(22) Filed: Oct. 23, 2014

(65) Prior Publication Data

US 2015/0363459 A1 Dec. 17, 2015

(30) Foreign Application Priority Data

Jun. 11, 2014 (JP) .................................. 2014-120508

(51) Int. Cl.
*G06F 17/30* (2006.01)

(52) U.S. Cl.
CPC .. *G06F 17/30176* (2013.01); *G06F 17/30144* (2013.01)

(58) Field of Classification Search
CPC . H04L 67/06; H04L 67/1095; H04L 29/0854; H04L 67/1097; H04L 67/18; G06F 17/30174; G06F 17/30221; G06F 17/30581; G06F 11/1451; G06F 11/1464; G06F 17/30011; G06F 17/30067; G06F 17/30076; G06F 17/30079; G06F 17/301; G06F 17/30215; G06F 17/3023; G06F 17/30253; G06F 17/30265; G06F 17/30353; G06F 17/30386; G06F 17/30722;
(Continued)

(56) References Cited

U.S. PATENT DOCUMENTS 7,680,835 B2 3/2010 MacLaurin et al.
8,332,357 B1 12/2012 Chung
(Continued)

FOREIGN PATENT DOCUMENTS

CN 101465730 A 6/2009
CN 101860571 A 10/2010
(Continued)

OTHER PUBLICATIONS

Communication dated Feb. 10, 2015 from the Japanese Patent Office in counterpart Application No. 2014-120508.
(Continued)

*Primary Examiner* — Greg C Bengzon
(74) *Attorney, Agent, or Firm* — Sughrue Mion, PLLC

(57) ABSTRACT

A communication terminal includes an acquiring part that, when a data set including real data representing content of the data set and attribute data indicating an attribute of the real data is newly stored on a data storage device, acquires the attribute data from the data storage device without waiting for a user to instruct that the attribute data is to be acquired, and acquires the real data after the user instructs that the real data is to be acquired, and a notification controller that controls a notifying part to notify the user of the attribute indicated by the attribute data acquired by the acquiring part.

9 Claims, 12 Drawing Sheets

(58) Field of Classification Search
CPC ............. G06F 17/30902; G06F 1/3212; G06F 1/3234; G06F 3/061; G06F 3/0646; G06F 3/0647
See application file for complete search history.

(56) References Cited

U.S. PATENT DOCUMENTS

| | | | |
|---|---|---|---|
| 8,620,861 B1 | 12/2013 | Uhrhane et al. | |
| 9,020,890 B2* | 4/2015 | Kottomtharayil | G06F 17/30174 707/635 |
| 9,112,936 B1* | 8/2015 | Poletto | H04L 29/0809 |
| 9,148,350 B1* | 9/2015 | Suryanarayanan | H04L 43/08 |
| 9,189,491 B2* | 11/2015 | Fushman | G06F 17/30867 |
| 9,286,327 B2 | 3/2016 | Kripalani et al. | |
| 9,330,106 B2 | 5/2016 | Piasecki et al. | |
| 9,449,014 B2 | 9/2016 | Bashyam et al. | |
| 2004/0177319 A1* | 9/2004 | Horn | G06F 17/3002 715/205 |
| 2005/0289107 A1* | 12/2005 | Arrouye | G06F 17/30 |
| 2005/0289109 A1* | 12/2005 | Arrouye | G06F 17/301 |
| 2005/0289133 A1* | 12/2005 | Arrouye | G06F 17/30067 |
| 2005/0289264 A1* | 12/2005 | Illowsky | G06F 1/3203 710/104 |
| 2007/0162538 A1* | 7/2007 | Kim | G06F 8/61 709/200 |
| 2008/0104277 A1* | 5/2008 | Tian | H04L 61/1582 709/248 |
| 2008/0154907 A1* | 6/2008 | Prasad | G06F 17/3005 |
| 2008/0168526 A1 | 7/2008 | Robbin et al. | |
| 2009/0150569 A1* | 6/2009 | Kumar | G06F 17/30174 709/248 |
| 2009/0181655 A1* | 7/2009 | Wallace, Jr. | G06F 17/30899 455/414.3 |
| 2009/0282169 A1* | 11/2009 | Kumar | H04L 67/1095 709/248 |
| 2010/0261488 A1* | 10/2010 | Little | H04L 12/1886 455/466 |
| 2011/0009133 A1* | 1/2011 | Hung | H04L 12/1886 455/466 |
| 2011/0295929 A1* | 12/2011 | Sagar | G06F 17/30168 709/203 |
| 2012/0041946 A1 | 2/2012 | Oka | |
| 2013/0024634 A1 | 1/2013 | Shitomi | |
| 2013/0054613 A1* | 2/2013 | Bishop | G06F 17/30011 707/748 |
| 2013/0212067 A1 | 8/2013 | Piasecki et al. | |
| 2013/0218835 A1 | 8/2013 | Greenspan et al. | |
| 2013/0262385 A1* | 10/2013 | Kumarasamy | G06F 17/30581 707/634 |
| 2013/0262386 A1 | 10/2013 | Kottomtharayil et al. | |
| 2013/0262392 A1* | 10/2013 | Vibhor | G06F 17/30557 707/654 |
| 2013/0262396 A1 | 10/2013 | Kripalani et al. | |
| 2013/0262410 A1 | 10/2013 | Liu et al. | |
| 2013/0263289 A1* | 10/2013 | Vijayan | G06F 21/60 726/31 |
| 2014/0006350 A1 | 1/2014 | Fukui et al. | |
| 2014/0040286 A1 | 2/2014 | Bane et al. | |
| 2014/0046900 A1 | 2/2014 | Kumarasamy et al. | |
| 2014/0046904 A1 | 2/2014 | Kumarasamy | |
| 2014/0149794 A1 | 5/2014 | Shetty et al. | |
| 2014/0171039 A1* | 6/2014 | Bjontegard | H04W 4/029 455/414.1 |
| 2014/0201137 A1 | 7/2014 | Vibhor et al. | |
| 2014/0201138 A1 | 7/2014 | Dorman et al. | |
| 2014/0201145 A1* | 7/2014 | Dorman | G06F 17/30575 707/634 |
| 2014/0201154 A1 | 7/2014 | Varadharajan et al. | |
| 2014/0289189 A1 | 9/2014 | Chan et al. | |
| 2014/0289225 A1 | 9/2014 | Chan et al. | |
| 2014/0324777 A1 | 10/2014 | Novak et al. | |
| 2014/0366042 A1* | 12/2014 | Chan | G06F 9/4825 719/318 |
| 2014/0372376 A1* | 12/2014 | Smith | G06F 17/30174 707/624 |
| 2014/0379586 A1* | 12/2014 | Sawyer | H04L 67/00 705/301 |
| 2015/0003812 A1 | 1/2015 | Soroka | |
| 2015/0032692 A1* | 1/2015 | Litzenberger | G06F 17/30174 707/620 |
| 2015/0112924 A1* | 4/2015 | Vanturennout | G06F 17/30174 707/610 |
| 2015/0120763 A1* | 4/2015 | Grue | G06F 17/30386 707/754 |
| 2015/0278330 A1* | 10/2015 | Hawa | G06F 17/30581 709/203 |
| 2015/0358406 A1* | 12/2015 | Scheer | H04L 67/1095 709/248 |
| 2015/0358408 A1* | 12/2015 | Fukatani | G06F 17/30174 709/204 |
| 2016/0022445 A1 | 1/2016 | Ruvalcaba et al. | |
| 2016/0119424 A1* | 4/2016 | Kane | G08B 27/001 709/203 |
| 2017/0091294 A1* | 3/2017 | Vibhor | G06F 17/30557 |
| 2017/0126807 A1* | 5/2017 | Vijayan | H04L 67/1097 |

FOREIGN PATENT DOCUMENTS

| | | |
|---|---|---|
| CN | 103067480 A | 4/2013 |
| JP | 2007-094477 A | 4/2007 |
| JP | 2008077485 A | 4/2008 |
| JP | 2009-064115 A | 3/2009 |
| JP | 2012038207 A | 2/2012 |
| JP | 5328739 B2 | 10/2013 |

OTHER PUBLICATIONS

Office Action dated Nov. 14, 2016 in copending U.S. Appl. No. 14/695,631.
Communication dated Feb. 2, 2018, from the State Intellectual Property Office of People's Republic of China in counterpart Application No. 201410742066.8.
Communication dated Oct. 15, 2018, issued by the State Intellectual Property of the P.R.C. in corresponding Chinese Application No. 201410742066.8.

* cited by examiner

FIG. 1
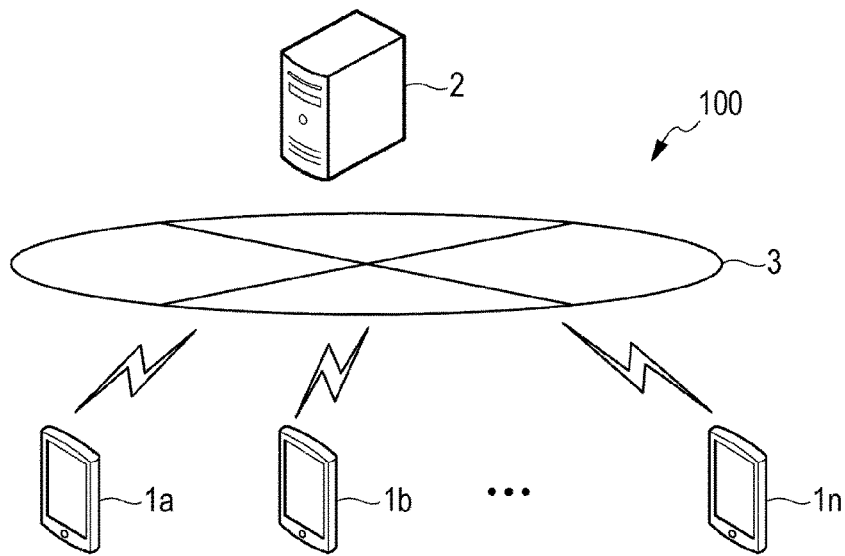
FIG. 2
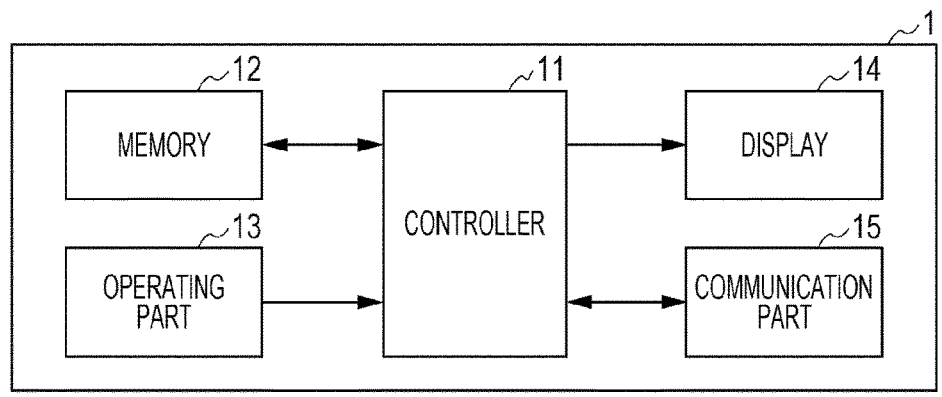
FIG. 3
| FILE NAME | BASIC ATTRIBUTES | | | |
|---|---|---|---|---|
| | STORAGE LOCATION | SIZE | CREATION DATE/TIME | UPDATE DATE/TIME |
| file1 | X\··· | XX kB | XX/XX/2014 | - |
| file2 | - | XX kB | XX/XX/2014 | - |
| file3 | X\··· | XX kB | XX/XX/2014 | XX/XX/2014 |
| ... | ... | ... | ... | ... |

FIG. 4

| FILE NAME | DETAILED ATTRIBUTES | | | |
|---|---|---|---|---|
| | TITLE | CREATOR | COMMENT | KEYWORD |
| file1 | DESIGN MATERIALS | - | - | - |
| file2 | - | - | URGENT | - |
| file3 | - | A | - | MINUTES |
| ... | ... | ... | ... | ... |

| FILE NAME | FILE ADDITION FLAG | REAL FILE UPDATE FLAG | ATTRIBUTE DATA UPDATE FLAG |
|---|---|---|---|
| file1 | 1 | 0 | 0 |
| file2 | 0 | 0 | 1 |
| file3 | 0 | 1 | 1 |
| ... | ... | ... | ... |

~123

FIG. 13
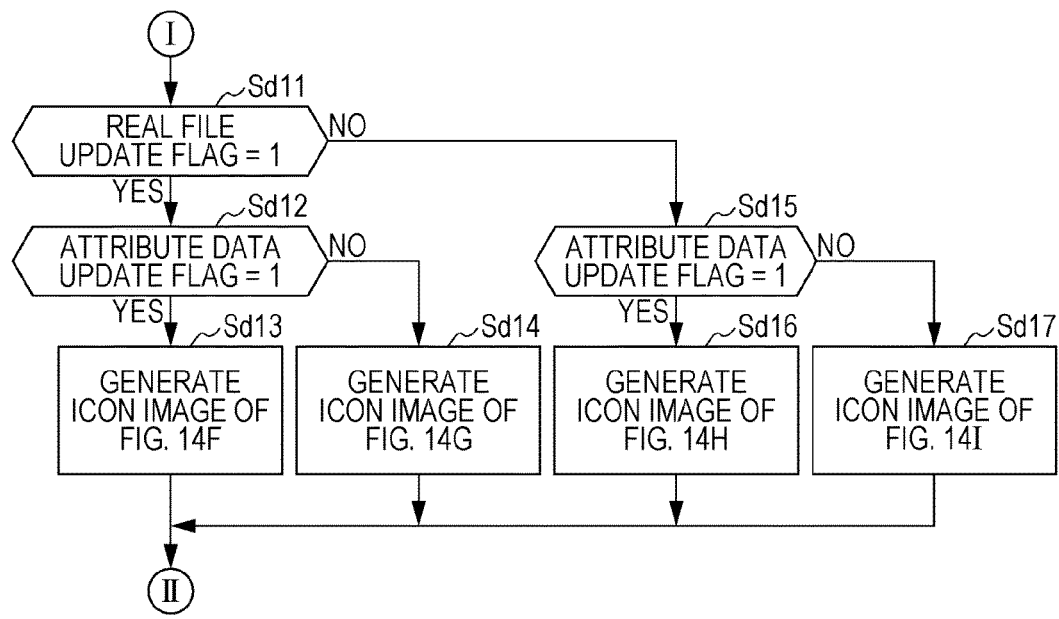
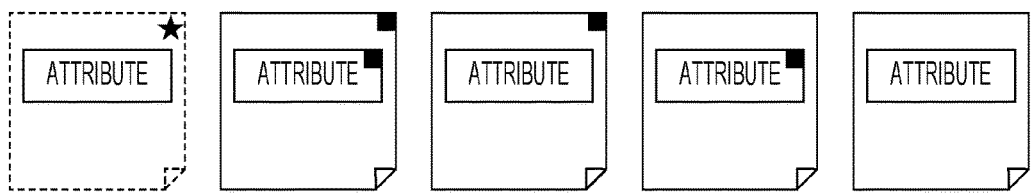
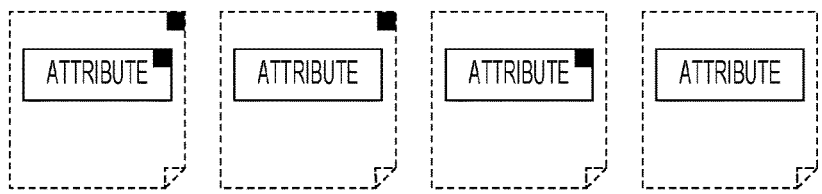

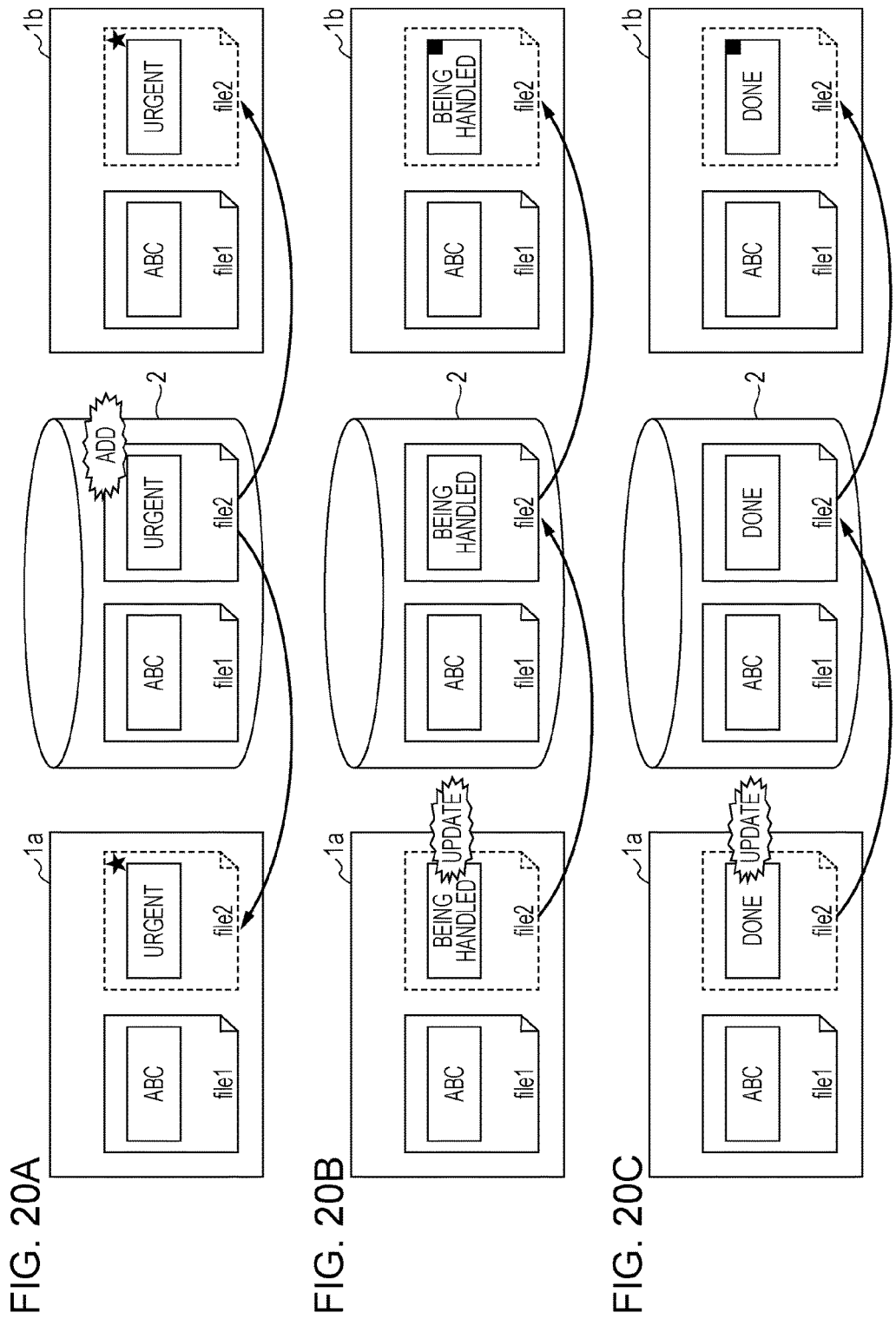

COMMUNICATION TERMINAL, COMMUNICATION SYSTEM, CONTROL TERMINAL, NON-TRANSITORY COMPUTER READABLE MEDIUM, AND COMMUNICATION METHOD

CROSS-REFERENCE TO RELATED APPLICATIONS

This application is based on and claims priority under 35 USC 119 from Japanese Patent Application No. 2014-120508 filed Jun. 11, 2014.

BACKGROUND

Technical Field

The present invention relates to a communication terminal, a communication system, a control terminal, a non-transitory computer readable medium, and a communication method.

SUMMARY

According to an aspect of the invention, there is provided a communication terminal including an acquiring part that, when a data set including real data representing content of the data set and attribute data indicating an attribute of the real data is newly stored on a data storage device, acquires the attribute data from the data storage device without waiting for a user to instruct that the attribute data is to be acquired, and acquires the real data after the user instructs that the real data is to be acquired, and a notification controller that controls a notifying part to notify the user of the attribute indicated by the attribute data acquired by the acquiring part.

BRIEF DESCRIPTION OF THE DRAWINGS

Exemplary embodiment of the present invention will be described in detail based on the following figures, wherein:

FIG. 1 illustrates an example of the configuration of a communication system;

FIG. 2 is a block diagram illustrating an example of the hardware configuration of a client terminal;

FIG. 3 illustrates an example of the data configuration of a basic attribute table;

FIG. 4 illustrates an example of the data configuration of a detailed attribute table;

FIG. 5 illustrates an example of the data configuration of a flag management table;

FIG. 13 is a flowchart illustrating an example of an icon image generation process;

FIGS. 14A to 14I each illustrate a display example of an icon image;

FIGS. 20A to 20C each illustrate an example of an attribute data updating and synchronization process.

DETAILED DESCRIPTION

Figure 6:
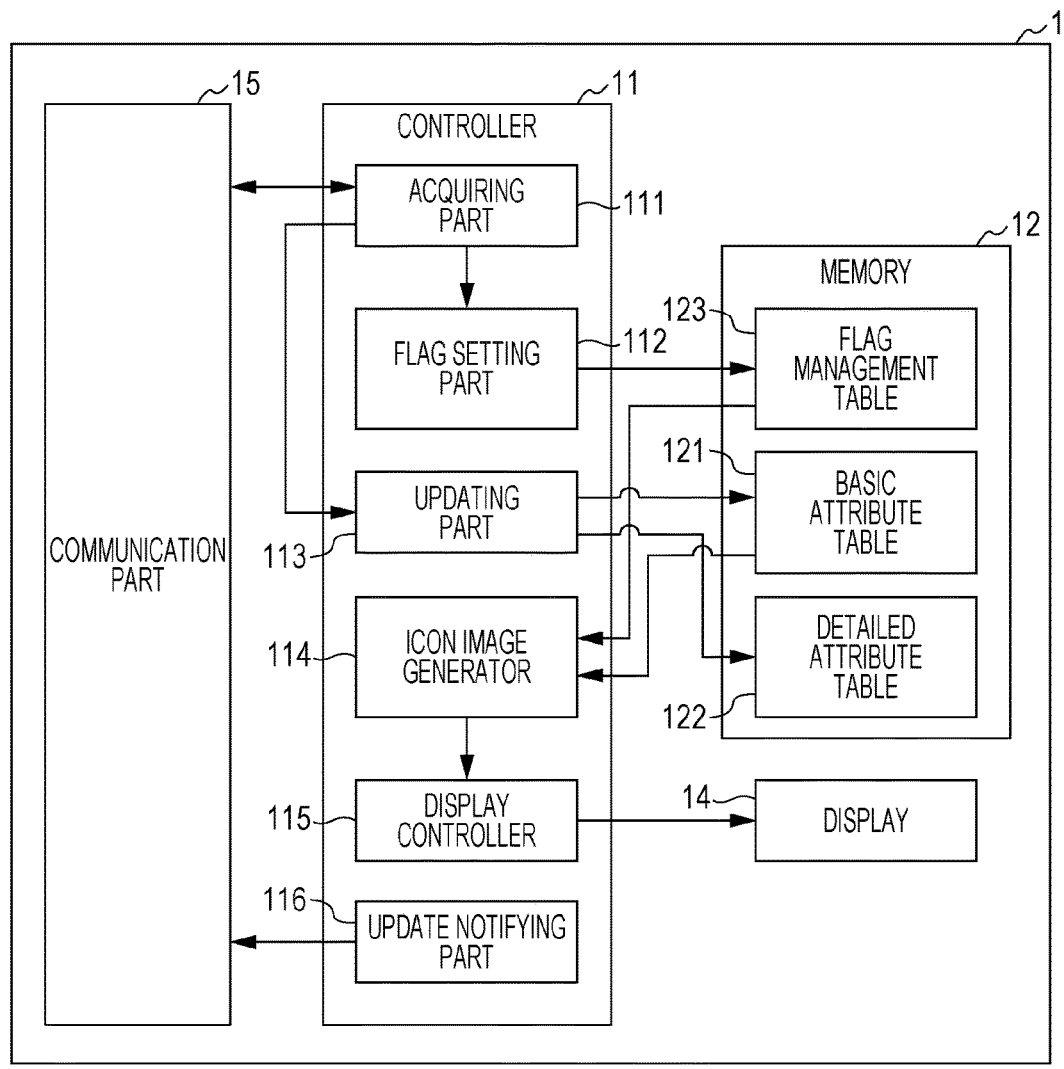
FIG. 6 is a block diagram illustrating an example of the configuration of a set of functions implemented by a controller.

Hereinafter, an exemplary embodiment of the present invention will be described with reference to figures.

1. Exemplary Embodiment

1-1. Configuration

1-1-1. Configuration of Communication System 100

FIG. 1 illustrates an example of the configuration of a communication system 100 according to an exemplary embodiment of the invention. As illustrated in FIG. 1, the communication system 100 has multiple client terminals 1a to 1n (to be collectively referred to as "client terminal 1" or "client terminals 1" hereinafter), and a server 2. Each of the client terminals 1 and the server 2 are connected to each other via a communication line 3. The communication line 3 is implemented by, for example, a mobile communication network, the Internet, or a combination of a mobile communication network and the Internet. In the communication system 100, files are synchronized across the client terminals 1 via the server 2.

1-1-2. Configuration of Client Terminal 1

FIG. 2 is a block diagram illustrating an example of the hardware configuration of the client terminal 1. The client terminal 1 is, for example, a personal computer. More specifically, the client terminal 1 is a portable terminal such as a smartphone or a tablet terminal, or a desktop computer. The client terminal 1 is an example of "communication terminal" and "control terminal" according to the exemplary embodiment of the invention.

As illustrated in FIG. 2, the client terminal 1 includes a controller 11, a memory 12, an operating part 13, a display 14, and a communication part 15.

The controller 11 includes, for example, a central processing unit (CPU), a read only memory (ROM), and a random access memory (RAM). The CPU loads a program from the ROM or the memory 12 into the RAM and executes the program.

The memory 12 is a storage device such as a flash memory or a hard disk drive (HDD). The memory 12 may be a storage device that can be removed from the client terminal 1, such as a memory card. The memory 12 stores various files. A synchronization folder (or directory) for storing files shared with other client terminals 1 and the server 2 is set in the memory 12.

A file refers to, for example, a document file, an image file, an audio file, or a movie file. Each file includes real data representing its content, and attribute data indicating the attributes of the real data. Real data and attribute data are associated with each other. In this regard, for example, in the case of a document file, real data refers to the document data itself, and in the case of an image file, real data refers to the image data itself. A file is an example of "a data set" according to the exemplary embodiment of the invention.

The memory 12 also stores an attribute table that stores the attribute data of each file. Specifically, the memory 12 stores a basic attribute table 121 and a detailed attribute table 122.

FIG. 3 illustrates an example of the data configuration of the basic attribute table 121. The basic attribute table 121 is a table that stores a file name and basic attribute data in association with each other for each file stored in a synchronization folder. Each record in the basic attribute table 121 includes the following fields: file name, storage location, size, creation date/time, and update date/time.

File name represents identification information of a file. Storage location represents the location where the real data of this file (to be referred to as "real file" hereinafter) is stored on the client terminal 1. Size represents the size of this real file. Creation date/time represents the date/time when this real file is created. Update date/time represents the last date/time when this real file is updated.

A real file may include the thumbnail image data of a file.

FIG. 4 illustrates an example of the data configuration of the detailed attribute table 122. The detailed attribute table 122 is a table that stores a file name and detailed attribute data in association with each other for each file stored in a synchronization folder. Each record in the detailed attribute table 122 includes the following fields: file name, title, creator, comment, and keyword.

File name represents identification information of a file. Title represents the title or general description of content represented by a real file. Creator represents the person who has created this real file. Comment represents a comment on the content represented by this real file. Keyword represents a condition used to search for this file.

The memory 12 also stores a flag management table 123.

FIG. 5 illustrates an example of the data configuration of the flag management table 123. The flag management table 123 is a table for managing update status or the like for each file stored in a synchronization folder. Each record in the flag management table 123 includes the following fields: file name, file addition flag, real file update flag, and attribute data update flag.

File addition flag indicates whether the corresponding file is newly added to the server 2. Real file update flag indicates whether the real file of the file has been updated on the server 2. Attribute data update flag indicates whether the attribute data of the file has been updated on the server 2.

A flag set to "1" in the flag management table 123 is, for example, reset to "0" when an icon image of the corresponding file is displayed on the display 14. Alternatively, the flag is reset to "0" after elapse of a predetermined period of time.

The operating part 13 is, for example, a device such as a touch sensor, a keyboard, or a mouse. For example, the operating part 13 accepts a user's operation to instruct that a list of files stored in a synchronization folder is be displayed. Alternatively, the operating part 13 accepts an operation to select an icon image of a file displayed on the display 14, or an operation to instruct that this file (more specifically, the real file) is to be acquired. Alternatively, the operating part 13 accepts an operation to update the attribute data of a file stored in a synchronization folder. The operating part 13 is an example of "accepting part" according to the exemplary embodiment of the invention.

The display 14 is an example of a display device such as a liquid crystal display. For example, the display 14 displays an icon image of a file stored in the memory 12. The display 14 is an example of "notifying part" according to the exemplary embodiment of the invention. The display 14 may not be configured as an integral component of the client terminal 1.

The communication part 15 is, for example, a communication interface such as a data communication card. The communication part 15 communicates data with an external apparatus via the communication line 3.

FIG. 6 is a block diagram illustrating an example of the configuration of a set of functions implemented by the controller 11. By executing a program stored in the ROM or the memory 12, the controller 11 implements a set of functions including an acquiring part 111, a flag setting part 112, an updating part 113, an icon image generator 114, a display controller 115, and an update notifying part 116.

The acquiring part 111 acquires attribute data indicating the attributes of a real file from a memory that stores the real file, without acquiring the real file. Further, the acquiring part 111 acquires the real file when the operating part 13 accepts an instruction to acquire the real file. At this time, the memory mentioned above is, for example, a memory 22 of the server 2 described later.

More specifically, when a file is newly stored on the server 2, the acquiring part 111 acquires the attribute data of the file without waiting for the user to instruct the acquiring part 111 to acquire the attribute data, and acquires the real file of the file after the user instructs the acquiring part 111 to acquire the real file.

When the attribute data of a file is updated on the server 2 that stores the file, the acquiring part 111 acquires the updated attribute data without waiting for the user to instruct the acquiring part 111 to acquire the updated attribute data. When the real file of the file is updated, the acquiring part 111 acquires update data indicating this update without waiting for the user to instruct the acquiring part 111 to acquire the updated data, and acquires updated real data after the user instructs the acquiring part 111 to acquire the updated real data.

The flag setting part 112 executes a flag setting process described later. Specifically, for each file whose attribute data has been acquired by the acquiring part 111, the flag setting part 112 sets a flag in the flag management table 123 on the basis of the attribute data.

The updating part 113 updates data (excluding storage location data) stored in the basic attribute table 121 and the detailed attribute table 122, on the basis of attribute data acquired by the acquiring part 111.

The icon image generator 114 executes an icon image generation process described later. Specifically, the icon image generator 114 generates an icon image for a file whose attribute data or real file has been acquired by the acquiring part 111. More specifically, for each file whose attribute data is stored in the basic attribute table 121 and the detailed attribute table 122, the icon image generator 114 generates an icon image by referencing the flag management table 123.

When generating an icon image, for example, the icon image generator 114 generates an image of a font from text data indicating the detailed attributes of attribute data, and uses this image as an icon image. The icon image generator 114 may synthesize the generated icon image on an icon image indicating the cover of the real file.

Alternatively, the icon image generator 114 may synthesize the generated icon image on an icon image indicating that the real file has not been synchronized yet on the client terminal 1.

A font image generated by the icon image generator 114 may have a size larger than or equal to a predetermined font size. In an icon image on which a font image is to be synthesized, an area (specifically, a position and size) in which the font image is displayed may be determined in advance. If the font image does not fit in the predetermined area, the portion of the font image that lies outside the predetermined area may be deleted.

The display controller 115 controls the display 14 to display attributes indicated by attribute data acquired by the acquiring part 111. Specifically, the display controller 115 controls the display 14 to display an icon image generated by the icon image generator 114. The display controller 115 controls the display 14 to display an icon image indicating information about the attribute data acquired by the acquiring part 111, so that the operating part 13 accepts an instruction to acquire a real file corresponding to the attribute data. When, after the icon image is displayed, attribute data stored in a memory and corresponding to the icon image is changed, the display controller 115 controls the display 14 to display a new icon image corresponding to the changed attribute data. At this time, the memory mentioned above is, for example, the memory 22 of the server 2 described later.

The display controller 115 controls the display 14 to display a notification of an update indicated by update data acquired by the acquiring part 111. Specifically, the display controller 115 controls the display 14 to display an icon image that notifies an update to the real file.

The display controller 115 is an example of "notification controller" and "controller" according to the exemplary embodiment of the invention.

The update notifying part 116 notifies the server 2 of information about an update, when attribute data is updated by the user of the client terminal 1 for a file whose attribute data or real file has been acquired by the acquiring part 111.

1-1-3. Configuration of Server 2

Figure 7:
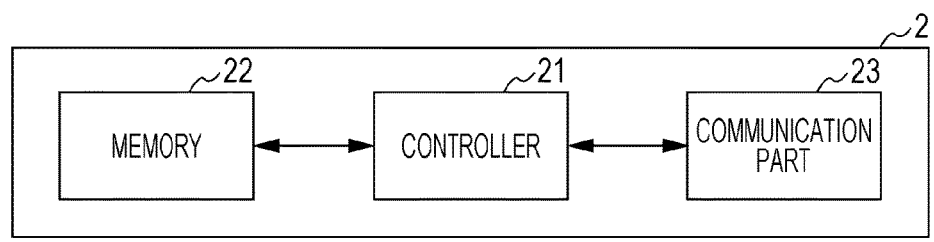
FIG. 7 is a block diagram illustrating an example of the hardware configuration of a server.

FIG. 7 is a block diagram illustrating an example of the hardware configuration of the server 2. The server 2 is an example of "data storage device" and "data transmitting device" according to the exemplary embodiment of the invention. As illustrated in FIG. 7, the server 2 includes a controller 21, the memory 22, and a communication part 23.

The controller 21 includes, for example, a CPU, a ROM, and a RAM. The CPU loads a program from the ROM or the memory 22 into the RAM and executes the program. The memory 22 is a storage device such as an HDD. The memory 22 may be provided outside the server 2 and connected to the server 2 via the communication line 3. The memory 22 stores various files. A synchronization folder (or directory) for storing files shared with the client terminal 1 is set in the memory 22.

The memory 22 stores attribute tables for storing the attribute data of each file. Specifically, the memory 22 stores a basic attribute table 221 and a detailed attribute table 222. The basic attribute table 221 is a table that stores a file name and basic attribute data in association with each other for each file stored in a synchronization folder. The detailed attribute table 222 is a table that stores a file name and detailed attribute data in association with each other for each file stored in a synchronization folder. Since the data configurations of the basic attribute table 221 and the detailed attribute table 222 are the same as those of the basic attribute table 121 and the detailed attribute table 122 stored in the memory 12 of the client terminal 1, respectively, a description of their data configurations is omitted. Unlike the basic attribute table 121, storage location data stored in the basic attribute table 221 is data indicating a location on the server 2 where a real file is stored.

Figure 8:
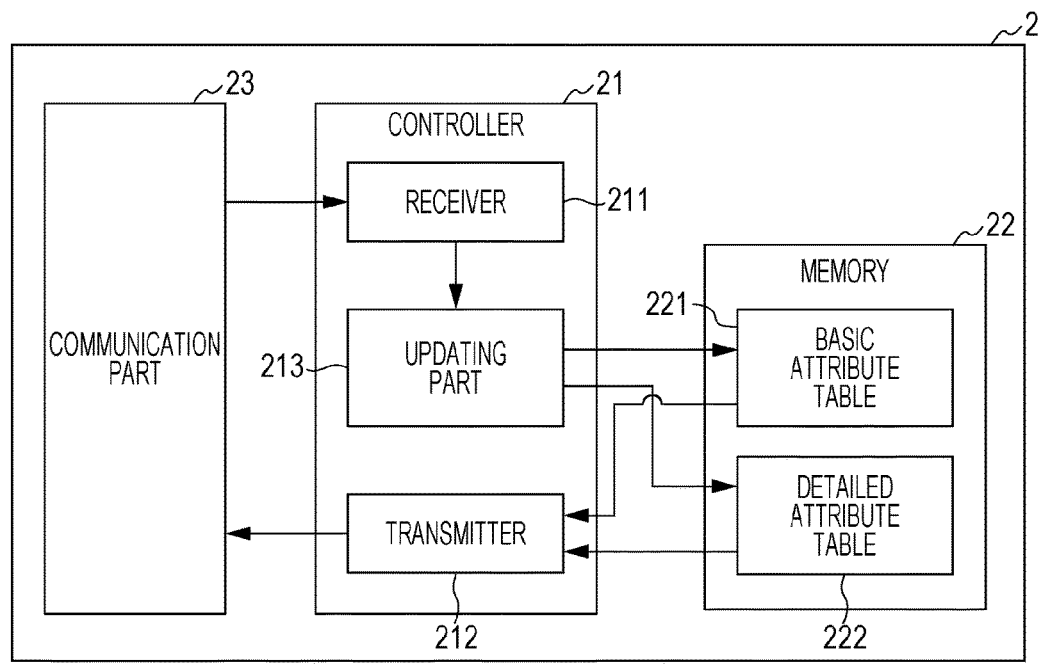
FIG. 8 is a block diagram illustrating an example of the configuration of a set of functions implemented by a controller.

FIG. 8 is a block diagram illustrating an example of the configuration of a set of functions implemented by the controller 21. By executing a program stored in the ROM or the memory 22, the controller 21 implements a set of functions including a receiver 211, a transmitter 212, and an updating part 213.

The receiver 211 receives a request for the attribute data or real file of a file from the client terminal 1. The receiver 211 also receives, from the client terminal 1, an update notification that notifies an update to the attribute data of a file.

The transmitter 212 transmits the attribute data of a file to the client terminal 1, when a request for the attribute data is received by the receiver 211. Further, the transmitter 212 transmits the real file of a file to the client terminal 1, when a request for the real file is received by the receiver 211.

The updating part 213 updates attribute data stored in the detailed attribute table 222 when an update notification is received by the receiver 211. Further, the updating part 213 updates attribute data stored in the basic attribute table 221 and the detailed attribute table 222, when a new file is received by the receiver 211.

1-2. Operation

Next, operation of the communication system 100 will be described. Specifically, the following processes will be described.

(1) Attribute data synchronization process in which the client terminal 1 synchronizes the attribute data of a file with the server 2

(2) Icon display process in which the client terminal 1 displays an icon image of a file stored in a synchronization folder (3) Real file synchronization process in which the client terminal 1 synchronizes the real file of a file with the server 2

(4) Attribute data updating and synchronization process in which in response to an update to the attribute data of a file on the client terminal 1, attribute data on another client terminal 1 is synchronized via the server 2

1-2-1. Attribute Data Synchronization Process

Figure 9:
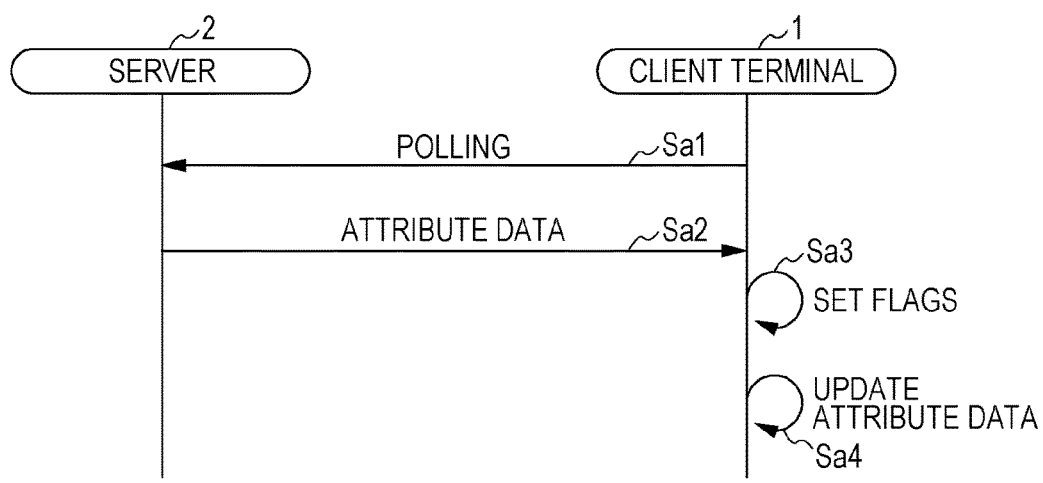
FIG. 9 is a sequence diagram illustrating an example of an attribute data synchronization process.

FIG. 9 is a sequence diagram illustrating an example of an attribute data synchronization process. The attribute data synchronization process illustrated in FIG. 9 is executed, for example, periodically by the client terminal 1.

In this attribute data synchronization process, the acquiring part 111 of the client terminal 1 polls the server 2 (step Sa1). Specifically, the acquiring part 111 requests the server 2 to provide the attribute data of each file stored in a synchronization folder on the server 2, that is, the attribute data of each file stored in the basic attribute table 221 and the detailed attribute table 222. When the receiver 211 of the server 2 receives a polling signal from the client terminal 1, the transmitter 212 of the server 2 transmits the attribute data (excluding storage location data) of each file stored in the basic attribute table 221 and the detailed attribute table 222, to the client terminal 1 (step Sa2).

When the acquiring part 111 of the client terminal 1 receives the attribute data from the server 2, the flag setting part 112 of the client terminal 1 sets a flag on the basis of the attribute data (step Sa3).

Figure 10:
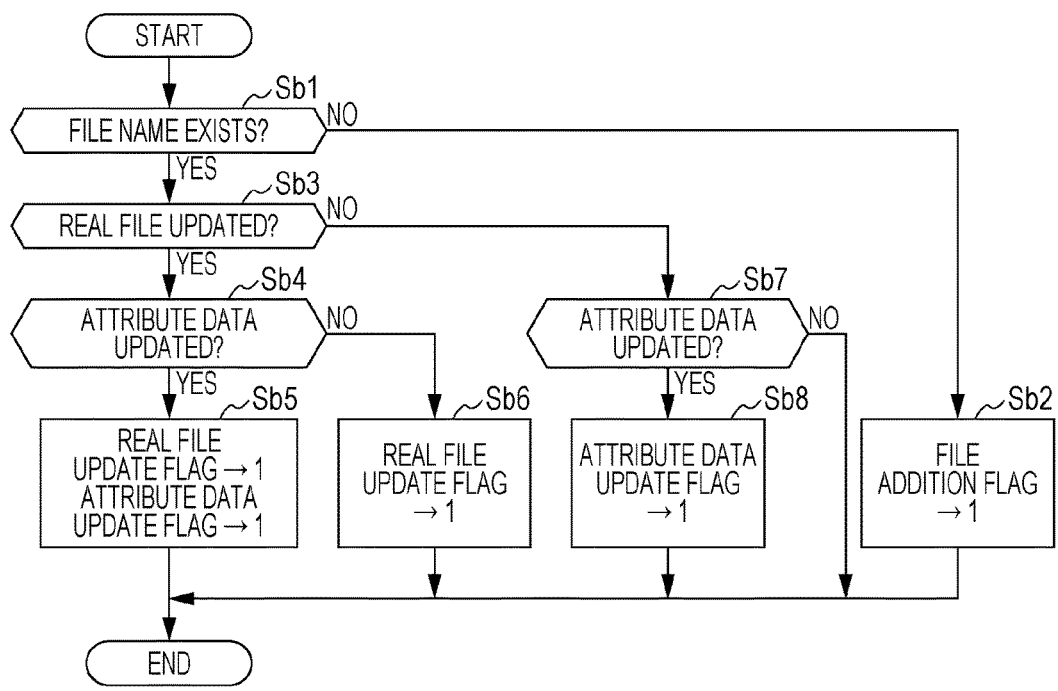
FIG. 10 is a flowchart illustrating an example of a flag setting process.

FIG. 10 is a flowchart illustrating an example of this flag setting process. The flag setting part 112 executes this flag setting process for each file whose attribute data has been received from the server 2.

In this flag setting process, the flag setting part 112 first determines whether the file name of the file of interest is already described in the basic attribute table 121 (step Sb1). If it is determined as a result of this process that the file name is not described in the basic attribute table 121 (step Sb1: NO), the flag setting part 112 sets the file addition flag to "1" in the flag management table 123 in association with the file name (step Sb2).

If it is determined as a result of this process that the file name is already described in the basic attribute table 121 (step Sb1: YES), the flag setting part 112 determines whether the real file of the file of interest has been updated (step Sb3). Specifically, for this file, the flag setting part 112 compares update date/time data received from the server 2 with update date/time data stored in the basic attribute table 121, and determines whether the two pieces of data are different. If it is determined as a result of this process that the real file of the file has been updated (Step Sb3: YES), the flag setting part 112 proceeds to step Sb4. If it is determined as a result of this process that the real file of the file has not been updated (step Sb3: NO), the flag setting part 112 proceeds to step Sb7.

In step Sb4, the flag setting part 112 determines whether the detailed attribute data of the file of interest has been updated (step Sb4). Specifically, the flag setting part 112 compares detailed attribute data received from the server 2 with detailed attribute data stored in the detailed attribute table 222, and determines whether the two pieces of data are different. If it is determined as a result of this process that the detailed attribute data of the file has been updated (step Sb4: YES), the flag setting part 112 sets the real file update flag and the attribute data update flag to "1" in association with the file name of this file (step Sb5).

If it is determined as a result of this process that the detailed attribute data of the file has not been updated (step Sb4: NO), the flag setting part 112 sets the real file update flag to "1" in association with the file name of this file (step Sb6).

In step Sb7, the flag setting part 112 determines whether the detailed attribute data of the file of interest has been updated. Specifically, the flag setting part 112 compares detailed attribute data received from the server 2 with detailed attribute data stored in the detailed attribute table 222, and determines whether the two pieces of data are different. If it is determined as a result of this process that the detailed attribute data of the file has been updated (step Sb7: YES), the flag setting part 112 sets the attribute data update flag to "1" in association with the file name of this file (step Sb8).

If it is determined as a result of this process that the detailed attribute data of the file has not been updated (step Sb7: NO), the flag setting part 112 sets none of the flags to "1" in association with the file name of this file.

When the flag setting process is finished, the updating part 113 of the client terminal 1 updates data (excluding storage location data) stored in the basic attribute table 121 and the detailed attribute table 122, on the basis of the attribute data received from the server 2 (step Sa4).

The above completes a description of the attribute data synchronization process.

1-2-2. Icon Display Process

Figure 11:
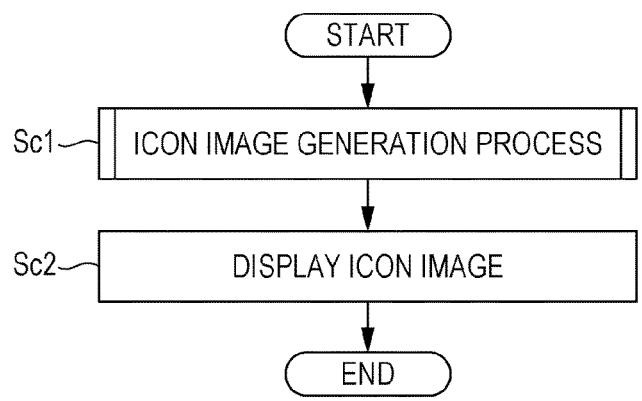
FIG. 11 is a flowchart illustrating an example of an icon display process.

FIG. 11 is a flowchart illustrating an example of an icon display process. The icon display process illustrated in FIG. 11 is executed when, for example, it is instructed by the user to display a list of files stored in a synchronization folder stored on the client terminal 1.

In this icon display process, in step Sc1, the icon image generator 114 of the client terminal 1 generates an icon image for each file stored in the synchronization folder.

Figure 12:
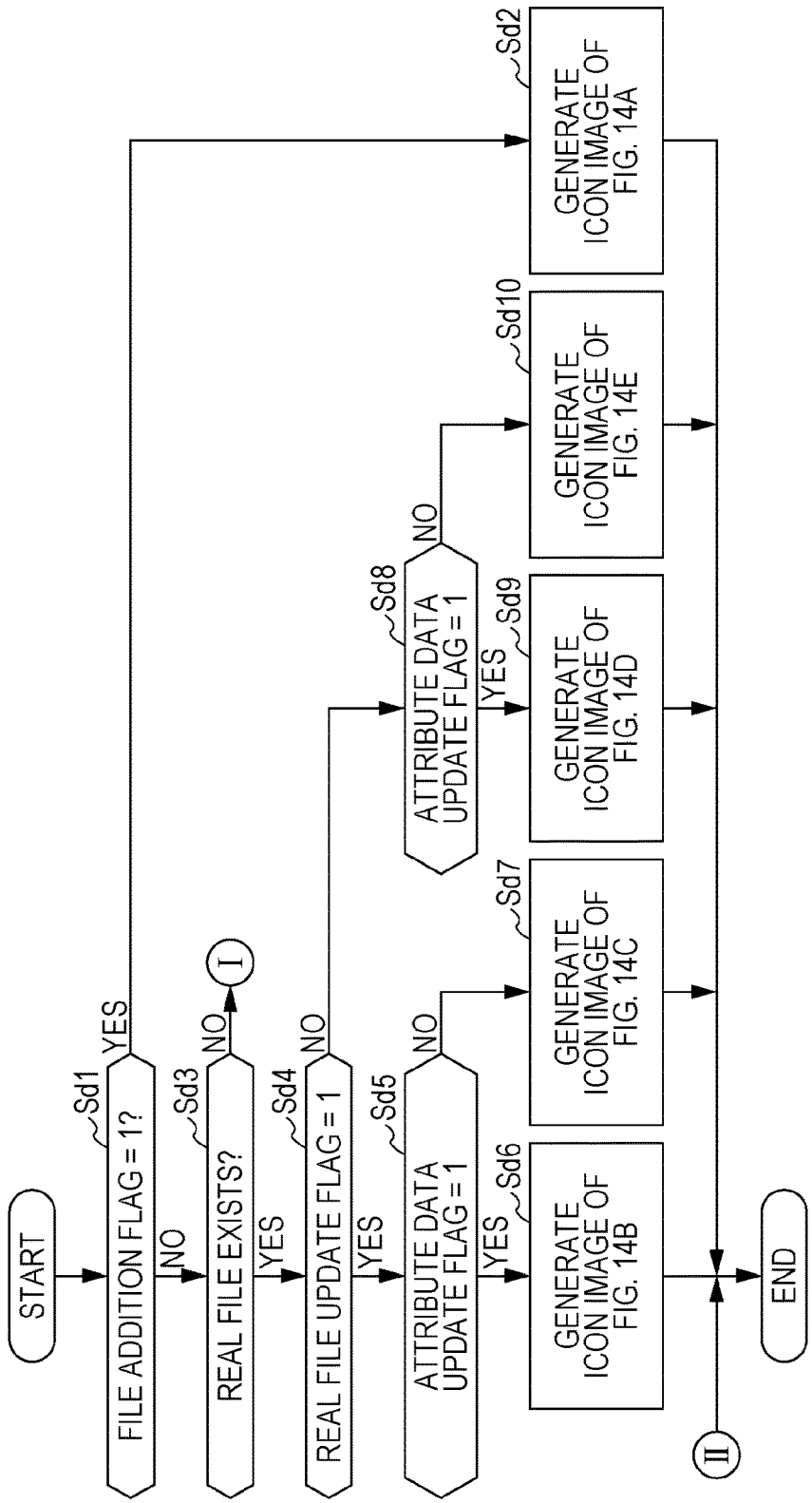
FIG. 12 is a flowchart illustrating an example of an icon image generation process.

FIGS. 12 and 13 are flowcharts illustrating an example of an icon image generation process. FIGS. 14A to 14I each illustrate a display example of an icon image generated in the icon image generation process.

The icon image generator 114 executes this icon image generation process by referencing the flag management table 123, for each file whose attribute data is stored in the basic attribute table 121 and the detailed attribute table 122.

In this icon image generation process, in step Sd1, the icon image generator 114 determines for the file of interest whether the file addition flag is set to "1". If it is determined as a result of this process that the file addition flag is set to "1" (step Sd1: YES), the icon image generator 114 generates an image of an icon in the form illustrated in FIG. 14A (step Sd2).

The icon in the form illustrated in FIG. 14A has a rectangular dashed outline resembling an actual icon. The dashed outline of the icon indicates that the real file corresponding to this icon has not been synchronized yet on the client terminal 1. The icon also has an asterisk inside its outline. This asterisk indicates that the real file corresponding to this icon is newly added to the server 2. The icon also has, inside its outline, a rectangular attribute indication area that shows the attribute data of the corresponding real file. The same applies for icons in other forms illustrated in FIGS. 14B to 14I.

Next, if it is determined as a result of step Sd1 that the file addition flag is not set to "1" (step Sd1: NO), the icon image generator 114 determines for the file of interest whether its real file is stored in the memory 12 (step Sd3). Specifically, the icon image generator 114 determines for this file whether its storage location is described in the basic attribute table 121. If it is determined as a result of this process that the real file is stored (step Sd3: YES), the icon image generator 114 proceeds to step Sd4. If it is determined as a result of this process that the real file is not stored (step Sd3: NO), the icon image generator 114 proceeds to step Sd11.

In step Sd4, the icon image generator 114 determines for the file of interest whether the real file update flag is set to "1". If it is determined as a result of this process that the real file update flag is set to "1" (step Sd4: YES), the icon image generator 114 proceeds to step Sd5. If it is determined as a result of this process that the real file update flag is not set to "1" (step Sd4: NO), the icon image generator 114 proceeds to step Sd8.

In step Sd5, the icon image generator 114 determines for the file of interest whether the attribute data update flag is set to "1". If it is determined as a result of this process that the attribute data update flag is set to "1" (step Sd5: YES), the icon image generator 114 generates an image of an icon in the form illustrated in FIG. 14B (step Sd6).

The icon in the form illustrated in FIG. 14B has a rectangular solid outline resembling an actual icon. The solid outline of the icon indicates that the real file corresponding to this icon has already been synchronized on the client terminal 1. The icon also has a rectangular mark inside its outline. This rectangular mark indicates that the real file corresponding to this icon has been updated on the server 2. Further, the icon has a rectangular mark inside its attribute indication area. This rectangular mark indicates that the attribute data of a file corresponding to this icon has been updated on the server 2.

Next, if it is determined as a result of step Sd5 that the attribute data update flag is not set to "1" (step Sd5: NO), the icon image generator 114 generates an image of an icon in the form illustrated in FIG. 14C (step Sd7). The icon in the form illustrated in FIG. 14C has a rectangular solid outline resembling an actual icon, and also has a rectangular mark inside its outline.

In step Sd8, the icon image generator 114 determines for the file of interest whether the attribute data update flag is set to "1". If it is determined as a result of this process that the attribute data update flag is set to "1" (step Sd8: YES), the icon image generator 114 generates an image of an icon in the form illustrated in FIG. 14D (step Sd9). The icon in the form illustrated in FIG. 14D has a rectangular solid outline resembling an actual icon, and also has a rectangular mark inside its attribute indication area.

If it is determined as a result of this process that the attribute data update flag is not set to "1" (step Sd8: NO), the icon image generator 114 generates an image of an icon in the form illustrated in FIG. 14E (step Sd10). The icon in the form illustrated in FIG. 14E has a rectangular solid outline resembling an actual icon.

In step Sd11, the icon image generator 114 determines for the file of interest whether the real file update flag is set to "1". If it is determined as a result of this process that the real file update flag is set to "1" (step Sd11: YES), the icon image generator 114 proceeds to step Sd12. If it is determined as a result of this process that the real file update flag is not set to "1" (step Sd11: NO), the icon image generator 114 proceeds to step Sd15.

In step Sd12, the icon image generator 114 determines for the file of interest whether the attribute data update flag is set to "1". If it is determined as a result of this process that the attribute data update flag is set to "1" (step Sd12: YES), the icon image generator 114 generates an image of an icon in the form illustrated in FIG. 14F (step Sd13). The icon in the form illustrated in FIG. 14F has a rectangular dashed outline resembling an actual icon, and also has a rectangular mark inside each of its outline and its attribute indication area.

If it is determined as a result of this process that the attribute data update flag is not set to "1" (step Sd12: NO), the icon image generator 114 generates an image of an icon in the form illustrated in FIG. 14G (step Sd14). The icon in the form illustrated in FIG. 14G has a rectangular dashed outline resembling an actual icon, and also has a rectangular mark inside its outline.

In step Sd15, the icon image generator 114 determines for the file of interest whether the attribute data update flag is set to "1". If it is determined as a result of this process that the attribute data update flag is set to "1" (step Sd15: YES), the icon image generator 114 generates an image of an icon in the form illustrated in FIG. 14H (step Sd16). The icon in the form illustrated in FIG. 14H has a rectangular dashed outline resembling an actual icon, and also has a rectangular mark inside its attribute indication area.

If it is determined as a result of this process that the attribute data update flag is not set to "1" (step Sd15: NO), the icon image generator 114 generates an image of an icon in the form illustrated in FIG. 14I (step Sd17). The icon in the form illustrated in FIG. 14I has a rectangular dashed outline resembling an actual icon.

When the icon image generating process is finished for all of files, the display controller 115 of the client terminal 1 controls the display 14 to display the icon image generated in step Sc1 (step Sc2).

The above completes a description of the icon display process.

FIGS. 15A to 17B each illustrate an example of an icon image displayed on the display 14 as a result of the icon display process.

Figure 15A:
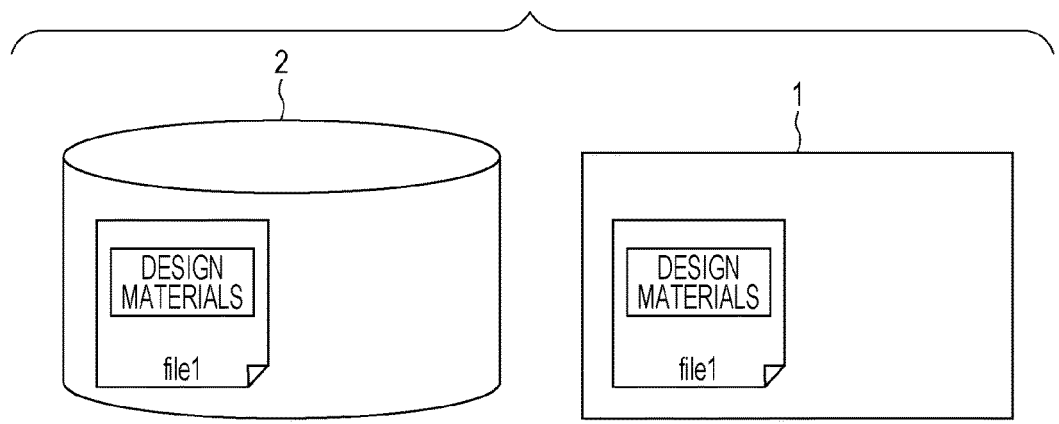
FIGS. 15A to 15C each illustrate an example of an icon image displayed as a result of an icon display process.
Figure 15B:
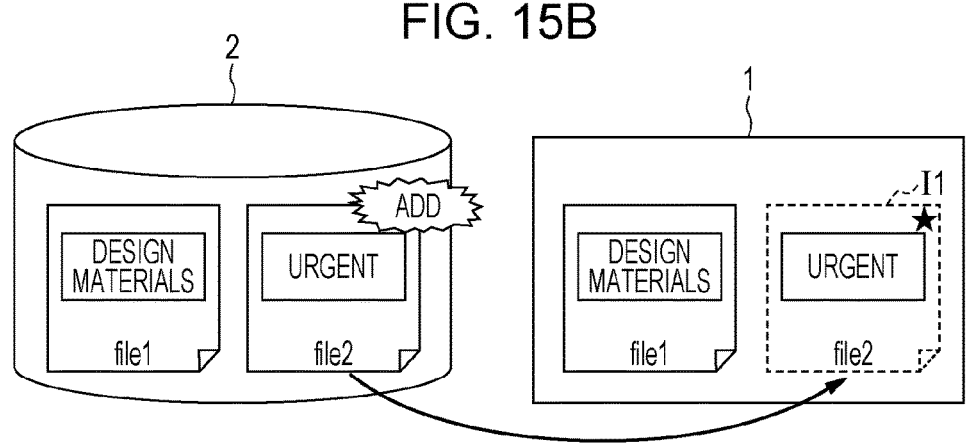

In a state in which only file1 is stored on each of the client terminal 1 and the server 2 as illustrated in FIG. 15A, when file2 is newly stored on the server 2 as illustrated in FIG. 15B, as a result of the above-mentioned attribute data synchronization process, the attribute data of file2 is acquired by the client terminal 1, and an icon I1 is displayed. That is, an image of an icon having a dashed outline with an asterisk inside the outline is displayed. This icon shows a comment "Urgent".

Figure 16A:
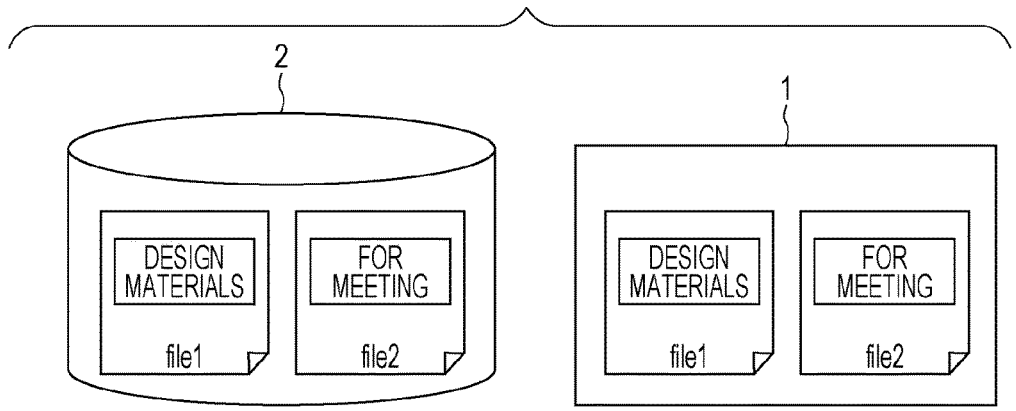
FIGS. 16A to 16C each illustrate an example of an icon image displayed as a result of an icon display process.
Figure 16B:
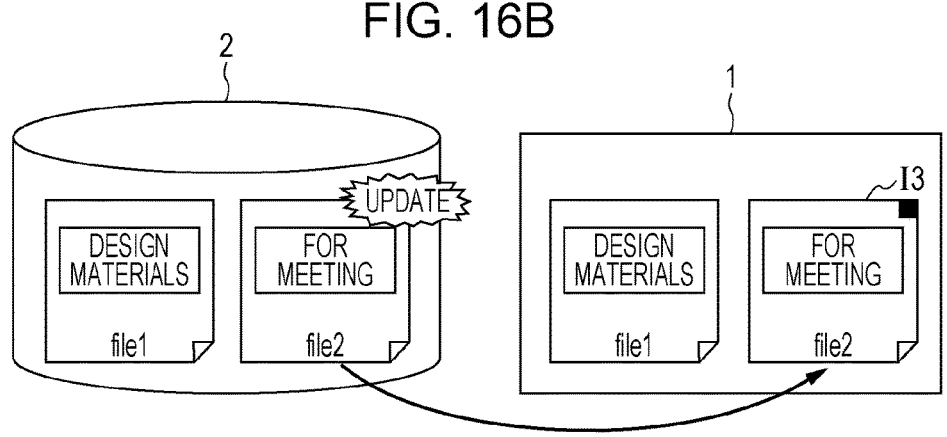

In another example, in a state in which file1 and file2 are stored on each of the client terminal 1 and the server 2 as illustrated in FIG. 16A, when the real file of file2 is updated on the server 2 as illustrated in FIG. 16B, as a result of the above-mentioned attribute data synchronization process, the update to file2 is recognized by the client terminal 1, and an icon image I3 is displayed. That is, an image of an icon having a rectangular mark side its outline is displayed.

Figure 17A:
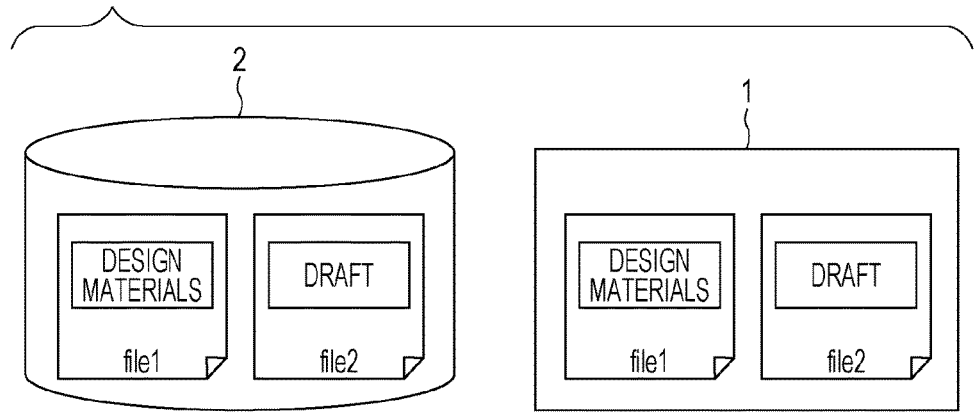
FIGS. 17A and 17B each illustrate an example of an icon image displayed as a result of an icon display process.
Figure 17B:
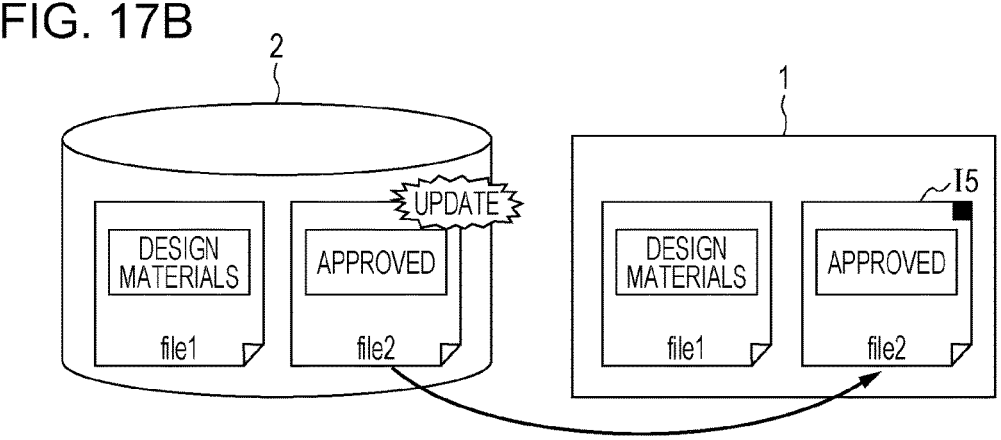

In still another example, in a state in which file1 and file2 are stored on each of the client terminal 1 and the server 2 as illustrated in FIG. 17A, when the attribute data (more specifically, comment) of file2 is updated on the server 2 as illustrated in FIG. 17B, as a result of the above-mentioned attribute data synchronization process, this update is recognized by the client terminal 1, and an icon image I5 is displayed. That is, an image of an icon showing a comment "Approved" and having a rectangular mark inside its attribute indication area is displayed.

1-2-3. Real File Synchronization Process

Figure 18:
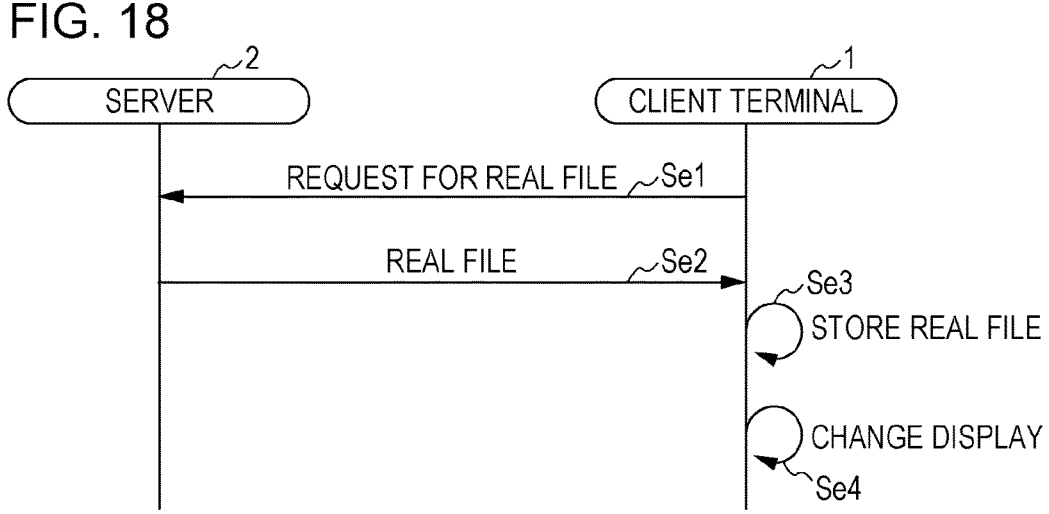
FIG. 18 is a sequence diagram illustrating an example of a real data synchronization process.

FIG. 18 is a sequence diagram illustrating an example of a real file synchronization process. For example, the real file synchronization process illustrated in FIG. 18 is executed when, in a state in which icon images of various files are displayed on the display 14 as a result of the above-mentioned icon display process, an icon image of a file whose real file has not been acquired yet or of a file that has not been updated yet is selected by the user, and it is instructed by the user to acquire the real file of this file.

In this real file synchronization process, in step Se1, the acquiring part 111 of the client terminal 1 requests the server 2 to provide the real file of a file corresponding to the icon image selected by the user. When the receiver 211 of the server 2 receives this request from the client terminal 1, the transmitter 212 of the server 2 reads the real file from the memory 22, and transmits the real file to the client terminal 1 (step Se2).

When the acquiring part 111 of the client terminal 1 receives the real file from the server 2, the acquiring part 111 of the client terminal 1 stores the real file into the memory 12 (step Se3). The acquiring part 111 also updates attribute data (specifically, storage location data and update date/time data) stored in the basic attribute table 121.

Figure 15C:
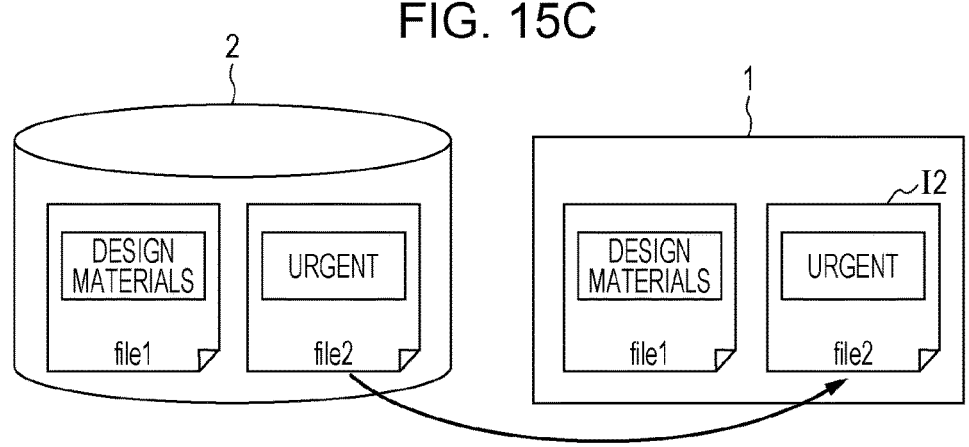

Next, the display controller 115 of the client terminal 1 controls the display 14 to change the icon image of the file displayed on the display 14 (step Se4). For example, in a state in which the icon image I1 of file2 is displayed as illustrated in FIG. 15B, when the real file of file2 is acquired as a result of step Se2, an icon image 12 is newly displayed as illustrated in FIG. 15C. That is, an image of an icon with a solid outline is displayed.

Figure 16C:
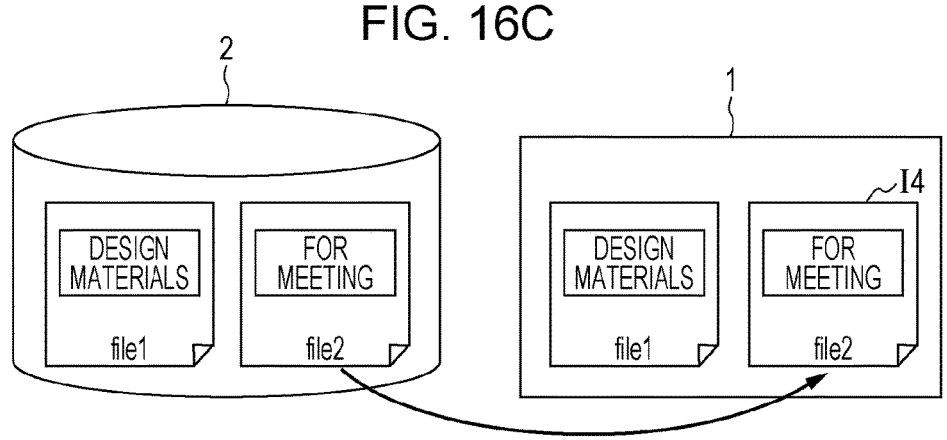

In another example, in a state in which the icon image 13 of file2 is displayed as illustrated in FIG. 16B, when the real file of file2 is acquired as a result of step Se2, an icon image 14 is newly displayed as illustrated in FIG. 16C. That is, an image of an icon without a rectangular mark inside its outline is displayed.

The above completes a description of the real file synchronization process.

1-2-4. Attribute Data Updating and Synchronization Process

Figure 19:
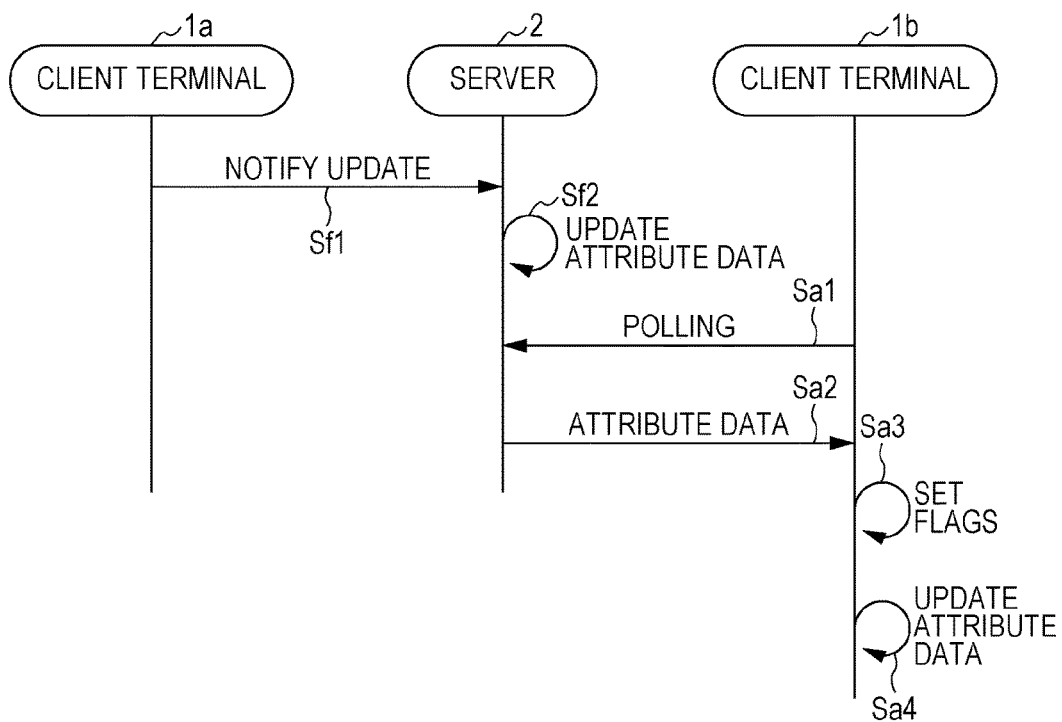
FIG. 19 is a sequence diagram illustrating an example of an attribute data updating and synchronization process.

FIG. 19 is a sequence diagram illustrating an example of an attribute data updating and synchronization process. The attribute data updating and synchronization process illustrated in FIG. 19 is executed when the attribute data of a file stored in a synchronization folder is updated by the user of the client terminal 1a.

In this attribute data updating and synchronization process, in step Sf1, the update notifying part 116 of the client terminal 1a transmits an update notification that notifies information about an update to the server 2. When the receiver 211 of the server 2 receives the update notification from the client terminal 1a, the updating part 213 of the server 2 updates the attribute data of the detailed attribute table 122 (step Sf2).

Thereafter, when the above-mentioned attribute data synchronization process is executed on the client terminal 1b, the information about an update mentioned above is reflected on the attribute data of the detailed attribute table 122 stored on the client terminal 1b.

The above completes a description of the attribute data updating and synchronization process.

FIGS. 20A to 20C each illustrate an example of the attribute data updating and synchronization process.

FIG. 20A illustrates a state in which file2 is newly stored on the server 2, and then, as a result of the attribute data synchronization process, the attribute data of file2 is acquired by each of the client terminals 1a and 1b.

FIG. 20B illustrates a state in which the real file of file2 is acquired by the client terminal 1a as a result of the real file synchronization process, and then the attribute data (comment in this case) of file2 is updated on the client terminal 1a. As illustrated in FIG. 20B, this update is reflected on the attribute data of file2 stored on each of the server 2 and the client terminal 1b, as a result of the attribute data updating and synchronization process mentioned above. Specifically, the comment "Urgent" is updated to "Being Handled". It is conceivable that the user of the client terminal 1b sees the updated comment "Being Handled" for file2, and then, by considering the fact that the content of file2 is under review by another user, the user may defer synchronization of the real file of file2 to wait for the results of the review.

FIG. 20C illustrates a state in which the attribute data of file2 has been further updated on the client terminal 1a. As illustrated in FIG. 20C, this update is reflected on the attribute data of file2 stored on each of the server 2 and the client terminal 1b, as a result of the attribute data updating and synchronization process mentioned above. Specifically, the comment "Being Handled" is updated to "Done". It is conceivable that the user of the client terminal 1b sees the updated comment "Done" for file2 and then, by considering the fact that file2 has been handled already, the user may determine that it is unnecessary to synchronize the real file of file2.

In the communication system 100 according to the exemplary embodiment mentioned above, when a file is newly added or when a file is updated on the server 2, attribute data is synchronized on the client terminal 1 without waiting for a user's instruction to do so, whereas the real file is synchronized on the client terminal 1 after waiting for a user's instruction to do so.

2. Modifications

The exemplary embodiment mentioned above may be modified as described below. Each of modifications described below may be combined with at least one another modification.

2-1. Modification 1

In the icon display process according to the exemplary embodiment mentioned above, if the attribute data of a file acquired by the acquiring part 111 matches a predetermined condition, the display controller 115 may control the display 14 to display attributes indicated by the attribute data. Specifically, if attributes indicated by this attribute data correspond to predetermined attributes, the display controller 115 may control the display 14 to display an icon image of this file. That is, the icon image displayed by the display controller 115 may be filtered on the basis of the attribute data of the corresponding file. For example, the display controller 115 may control the display 14 to display only the icon image of a file created by a creator "A", or display only the icon image of a file having a comment "Urgent" as its attribute data.

Alternatively, if attributes indicated by this attribute data correspond to predetermined attributes, the display controller 115 may control the display 14 to display an icon image of the corresponding file which shows the attributes indicated by the attribute data, and if attributes indicated by this attribute data do not correspond to predetermined attributes, the display controller 115 may control the display 14 to display an icon image of the corresponding file which does not show the attributes indicated by this attribute data. That is, which attribute or attributes an icon image displayed by the display controller 115 shows may be determined on the basis of the type of attribute data of the corresponding file or the number of attributes. For example, a comment may not be shown on the icon image, while a title may be shown on the icon image. Further, the number of attributes shown on the icon image may be limited to a predetermined number. This predetermined number may be provided for each type (specifically, extension) of file.

2-2. Modification 2

In the attribute data synchronization process according to the exemplary embodiment mentioned above, if acquired attribute data of a file matches a predetermined condition, the acquiring part 111 may acquire the real file of this file without waiting for a user's instruction to acquire the real file. For example, if acquired extension data of a file indicates an image file such as "jpeg", the acquiring part 111 may acquire the real file of this image file without waiting for a user's instruction to acquire the real file.

2-3. Modification 3

In the exemplary embodiment or modifications mentioned above, the program executed by the controller 11 of the client terminal 1 or by the controller 21 of the server 2 may be provided while being stored in a storage medium such as a magnetic tape, a magnetic disk, a flexible disk, a magneto-optical disk, or a memory. This program may be downloaded via a communication line such as the Internet.

2-4. Other Modifications

In the attribute data synchronization process according to the exemplary embodiment mentioned above, polling takes place from the client terminal 1 to the server 2. However, the client terminal 1 may be notified as soon as the server 2 detects an addition or update of a file or an update of attribute data.

In the exemplary embodiment mentioned above, synchronization for the real file of a file is one-way, from the server 2 to the client terminal 1. However, the synchronization may be two-way.

The various forms of icon images according to the exemplary embodiment mentioned above are only illustrative. Other forms of icon images may be used as long as the icon images notify the user of the presence of a file and the attributes of this file. The asterisk indicating an addition of a file, or the rectangular mark indicating an update of a real file or attribute data may be changed to other shapes. Furthermore, the user may be notified of the presence of a file by means of not only an icon (that is, a pictorial symbol) but also a symbol such as a simple letter.

As for attributes indicated by attribute data acquired by the acquiring part 111 or an update indicated by update data acquired by the acquiring part 111 in the exemplary embodiment mentioned above, a loudspeaker or vibrator may be controlled to notify the user of the attributes or update. In this case, the loudspeaker or vibrator is an example of "notifying part" according to the exemplary embodiment of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising
a processor programmed to:
  synchronize an attribute information when an attribute of a file is added or changed external to the apparatus;
  display an attribute image based on the attribute information;
  display a file content image corresponding to file content and indicating whether the file content is synchronized with the file;
  synchronize the file content in response to a user instruction;
  detect the absence of the user instruction; and
  refrain from synchronizing the file content in the absence of the user instruction;
  wherein the processor is further programmed to synchronize only the attribute information, among the attribute information and the file content, in the absence of the user instruction.

2. The apparatus according to claim 1, wherein the displayed file content image further indicating whether the file content has ever been acquired or not.

3. The apparatus according to claim 2, wherein in a case where the file content has never acquired, outline of the displayed file content image comprises dashed lines.

4. The apparatus according to claim 1, wherein:
the processor is further configured to synchronize the attribute information in response to the attribute information satisfying a condition.

5. The apparatus according to claim 4, wherein
the condition is satisfied when content of the attribute information indicates that urgent handling is required.

6. The apparatus according to claim 1, wherein
the attribute information is updated by another apparatus that is different from the apparatus.

7. The apparatus according to claim 1, wherein
the file is a document stored in an external server.

8. A non-transitory computer readable medium storing a program causing a computer of an apparatus to execute a process for processing information, the process comprising:
  synchronizing an attribute information when an attribute of a file is added or changed external to the apparatus;
  displaying an attribute image based on the attribute information;
  displaying a file content image corresponding to file content and indicating whether the file content is synchronized with the file;
  synchronizing the file content in response to a user instruction;
  detecting the absence of the user instruction;
  refraining from synchronizing the file content in the absence of the user instruction; and
  synchronizing only the attribute information, among the attribute information and the file content, in the absence of the user instruction.

9. A communication method in an apparatus comprising:
  synchronizing an attribute information when an attribute of a file is added or changed external to the apparatus;
  displaying an attribute image based on the attribute information;
  displaying a file content image corresponding to file content and indicating whether the file content is synchronized with the file;
  synchronizing the file content in response to a user instruction; and
  detecting the absence of the user instruction;
  refraining from synchronizing the file content in the absence of the user instruction; and
  synchronizing only the attribute information, among the attribute information and the file content, in the absence of the user instruction.

\* \* \* \* \*